Patented Aug. 16, 1938

2,127,127

UNITED STATES PATENT OFFICE 2,127,127

PROCESS FOR PRODUCING HYDROCARBONS FROM CARBON MONOXIDE AND HYDROGEN

Friedrich Martin, Oberhausen, and Otto Roelen and Walter Feisst, Oberhausen-Holten, Germany No Drawing. Application March 14, 1936, Serial No. 68,916. In Germany March 20, 1935

2 Claims. (Cl. 260—169)

Our invention relates to processes for the synthetical production of organic substances in which the reaction is induced or furthered by the presence of catalysts.

It is one object of our invention to provide means whereby reactions of the kind aforesaid and the processes involving such reactions can be carried through in a simpler and more economical manner than was hitherto possible.

With this and other objects in view we are now going to describe our invention, starting from the fact that hitherto in the carrying out of a great number of reactions and processes for the synthetical production of organic compounds, in which catalysts play an important rôle, considerable disturbances were created by the circumstance that these catalysts display a particularly high initial activity, in other words, that when the reaction is started, the fresh catalysts are more active than in the further course of the reaction. More especially when producing hydrocarbons by the interaction of oxides of carbon and hydrogen, the catalysts hitherto used displayed so high an initial activity, that provision had to be made for preventing the reaction from being injuriously influenced at the start. To this end these processes had to be started at far lower temperatures than corresponded to the normal operating temperature. But in spite of these precautionary measures the formation of methane could not altogether be avoided. There always remained the danger that owing to a too high activity of the catalyst a sudden rise of temperature took place, whereby the catalyst was overburnt and became useless.

A further drawback connected with the synthetical production of organic compounds in the presence of highly active catalysts consists therein, that the production as well as the handling of the catalysts, some of which possess pyrophoric properties, rendered it necessary to proceed with particular caution. Similar precautionary measures had to be taken when conveying the highly active catalysts into the reaction vessels. As a rule the plants for the production of the catalysts had to be arranged close to the reaction vessels. If, in order to avoid such drawbacks, the catalyst was prepared in the reaction vessel, operation in this vessel had to be interrupted whenever the catalyst had to be regenerated or replaced.

According to the present invention, we succeed in avoiding all the drawbacks above described by temporarily reducing the high initial activity of the catalysts. To this end we add to the catalysts either before or during or after their preparation, hydrocarbons or mixtures of hydrocarbons or of hydrocarbons with hydocarbon derivatives, either natural or synthetically prepared, which are liquid or can easily be liquefied. We may add solid hydrocarbons or derivatives thereof by melting or dissolving them for use. We have found it particularly suitable to add to the catalyst products of the reaction which the catalyst is expected to induce or further.

We may produce catalysts according to our invention by impregnating the catalytic material with, or suspending such material in, the liquid or liquefied hydrocarbons or their derivatives. We may thus for instance introduce the catalyst into the reaction vessel or chamber under the form of a suspension, the liquid admixture in excess of that required for the purpose in view being for instance removed by allowing it to drip off. The remainder of the hydrocarbon or the like admixed to the catalyst is then removed gradually; during the reaction, by the heat of the gases or vapors passing through the reaction vessel or chamber.

We have found it suitable to impregnate the catalyst with, or to suspend it in, a mixture of hydrocarbons, part of which boils at a lower temperature. We may for instance use for this purpose a mixture of oil and benzine (gasoline). After the catalyst has been treated with the mixture of hydrocarbons, the gasoline is evaporated by passing a current of gas in contact with the mixture, the gasoline being then recovered in a suitable manner, for instance with the aid of active carbon.

We thus provide that the catalyst absorbs only a comparatively small quantity of oil.

We have also found it advantageous to cool the reduced catalyst in a current of an inert gas such as for instance nitrogen, methane, ethane, carbon dioxide or a gas mixture containing one or a plurality of these gases, for instance the gas recovered as a byproduct in the synthetical production of gasoline, and we then treat the catalyst with a mixture of hydrocarbons containing low-boiling fractions. During the cooling down of the catalyst this latter absorbs the respective gas or gases and is therefore incapable of absorbing so much of the oil mixture as if the catalyst were impregnated with oil, while being still hot and not impregnated with one of the gases.

When using a catalyst pretreated in accordance with our invention, in processes of synthetical production of organic compounds, for instance in the production of benzine (gasoline) by reacting carbon oxides with hydrogen, we obtain very considerable advantages. Thus for instance the catalyst having been filled into the reaction vessel need not be subjected to a protracted pretreatment, but the reaction can be started at once. In view of the impregnation of the catalyst with the additional matter, such as a paraffinic hydrocarbon, the reaction at first starts gently and is then carried on more vigorously in proportion as the additional matter is carried away by the gases and vapors escaping from the reaction vessel. We thereby also do away with the exceedingly great danger of initial overheating and overburning of the catalyst, while at the same time obtaining a considerably increased yield of benzines to be produced, since the formation of methane, which otherwise always occurs when starting the reaction, is greatly reduced and other secondary reactions are suppressed also.

The efficiency and the most favorable conditions of utilization of each charge of catalyst can be ascertained very precisely before charging the catalyst into the reaction vessel.

We have further found that the operation of the processes here in view is also greatly simplified by the fact that the necessary pretreatment of the catalysts, for instance their reduction, can be carried through in a simple, continuously operated apparatus serving to supply a great number of reaction vessels with the catalyst, which may even be separated by large distances, since the molten or dissolved hydrocarbons, such as for instance paraffine, completely surround the catalyst at ordinary temperature with a protective envelope.

Obviously the process according to this invention does not in any way impair the high activity of the catalysts as such, but merely does away with the injurious effects resulting from their high initial activity. After the additional matter has been removed, the synthetical reaction is carried on with the full activity of the catalyst.

We have found that our process offers particular advantages in those cases where the temperature of reduction of the catalyst is materially higher than the subsequent operating temperature of the synthetical process, as is the case for instance with nickel catalysts used in the synthetical production of benzine. Hitherto the production of benzine with the aid of nickel catalysts was hampered by particular difficulties inasmuch as during the phase of production of the catalyst the reaction vessel or chamber had to be heated considerably beyond the operating temperature, which in many cases proved very difficult or even impossible. On the other hand, the conveying of a catalyst, prepared in a separate oven and extremely sensitive against the action of air, into the reaction vessel had to be carried through with particular precaution. When carrying out the synthetical production of benzine in the presence of nickel catalysts embodying our invention, all these difficulties are avoided.

In practising our invention we may for instance proceed as follows:—

Example 1

Equal parts kieselguhr and cobalt carbonate, to which small quantities of an activating addition have been added, are mixed with so much of a solution, in benzine, of a paraffine melting at 40° C., that after evaporation of the benzine there remain in the catalyst mass about 5% paraffine, calculated on the mass as a whole. This mass is then shaped in an eccentric press into shapes 4 millimeters in diameter and height. The presence of paraffine greatly facilitates the pressing procedure, since the molds can be filled more uniformly, the material does not stick to the metal walls and the pressed shapes are stronger and more resistive against mechanical influences at equal density than similar shapes which do not contain any paraffine.

The shaped material thus obtained is introduced into a reaction vessel and reduced in this vessel with hydrogen at about 200° C. as usual. The paraffine in excess, which is not retained on the surface of the catalyst, drips off the catalyst which is arranged on sieve plates. The reaction mixture containing carbon monoxide and hydrogen is now introduced into the vessel and the reaction between the gases sets in slowly although the vessel is at once heated to the normal operating temperature. Once the reaction has been started, the gases and vapors passing through the vessel permanently carry away parts of the additional matter (paraffine and paraffine oil). After all the additional matter has thus been removed, the reaction proceeds at full strength. The temporary presence of the additional matter has not in any way impaired the activity of the catalyst, merely the injurious effects of the high initial activity being avoided so that any injurious overheating and undue formation of methane have been prevented from arising. With a catalyst such as here described the operation with the gas mixture to be reacted can be started at once without any circumstantial and time-consuming precautionary measures and without the danger of any disturbances.

Instead of producing, in the manner above described, pressed shapes with the aid of a solution of paraffine in benzine, we may for instance also use granules produced from the catalyst material by treating same in a revolving drum with a small quantity of paraffine oil. To this end, the mixture of materials designed to form the catalyst is for instance subjected to a preliminary pressure treatment and thereafter, if necessary, after having previously been comminuted, is forced through a sieve having meshes corresponding to the particle size desired. The mixture of granules and dust obtained in this process is now treated some time in a slowly revolving drum, which is filled only partly with paraffine oil sprayed into the drum in finely divided condition. By this treatment we succeed in altogether disposing of the dust so that at the end of the operation the drum only contains small granules of substantially uniform size. The presence of the oil causes the particles constituting the granules to cohere. Obviously this treatment allows the mass to be impregnated with a hydrocarbon and to be granulated without the formation of dust.

Example 2

In a solution of nickel nitrate, to which some aluminum nitrate is admixed, sodium carbonate is added somewhat in excess of the calculated quantity, whereby finely divided nickel carbonate is precipitated on a carrier such as kieselguhr. In the product thus obtained two parts kieselguhr are mixed with one part nickel. The product is now washed with water, dried, comminuted and granulated. The granules are reduced at 450° C. with hydrogen in a revolving drum. The reduced product is now entered, under seclusion from air or gases containing oxygen, in molten paraffine and after being impregnated therewith the paraffine in excess is removed. After cooling the granulated mass is hard and resistive against mechanical influences, being altogether insensitive against the action of air. It can be stored and transported without any particular precautionary measures and can be filled into the reaction vessels according to requirements. The reaction can then be carried through in these vessels for instance at a temperature of 200° C. as above described.

Various changes may be made in the details disclosed in the foregoing specification without departing from the invention or sacrificing the advantages thereof.

We claim:—

1. The process of producing hydrocarbons which comprises reducing a material adapted for the formation of a catalyst by reduction at a temperature above normal, cooling down the catalyst thus obtained in a current of an inert gas, treating the cooled catalyst with a mixture of hydrocarbons containing low-boiling fractions, and passing a mixture of a carbon oxide and hydrogen at elevated temperature in contact with the catalyst thus treated.

2. The process of producing benzine (gasoline), which comprises reducing a material adapted for the formation of a catalyst by reduction at a temperature above normal, cooling down the catalyst thus obtained in a current of gas recovered as a byproduct in the synthetical production of gasoline, treating the cooled catalyst with a mixture of hydrocarbons containing low-boiling fractions, and passing a mixture of a carbon oxide and hydrogen at elevated temperature in contact with the catalyst thus treated.

FRIEDRICH MARTIN.
OTTO ROELEN.
WALTER FEISST.